United States Patent
Jones et al.

(10) Patent No.: US 6,521,861 B2
(45) Date of Patent: Feb. 18, 2003

(54) METHOD AND APPARATUS FOR INCREASING WELDING RATE FOR HIGH ASPECT RATIO WELDS

(75) Inventors: Marshall Gordon Jones, Scotia, NY (US); Carl Edward Erikson, Schenectady, NY (US); Kamlesh Mundra, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/683,594

(22) Filed: Jan. 23, 2002

(65) Prior Publication Data

US 2002/0117485 A1 Aug. 29, 2002

Related U.S. Application Data

(63) Continuation-in-part of application No. 09/498,984, filed on Feb. 7, 2000, now abandoned.

(51) Int. Cl.[7] .............................................. B23K 26/24
(52) U.S. Cl. ................................................. 219/121.64
(58) Field of Search ...................... 219/121.63, 121.64, 219/121.65, 121.66, 121.72, 136, 137 R, 137 WM

(56) References Cited

U.S. PATENT DOCUMENTS

| 3,555,239 A | * | 1/1971 | Kerth |
| 4,580,026 A | * | 4/1986 | Stol |
| 4,634,832 A | | 1/1987 | Martyr |
| 4,737,612 A | | 4/1988 | Bruck et al. |
| 4,803,334 A | * | 2/1989 | Burke et al. |
| 5,793,009 A | * | 8/1998 | Offer |
| 5,889,254 A | | 3/1999 | Jones |
| 5,958,261 A | * | 9/1999 | Offer et al. |

FOREIGN PATENT DOCUMENTS

| DE | 3905684 A | 8/1990 |
| DE | 3928092 A | 2/1991 |
| EP | 740976 | 11/1996 |

OTHER PUBLICATIONS

A copy of the European Search Report dated Jun. 22, 2001.
English Language Abstracts for DE3928092 & DE3905684 are provided to fulfill Applicants' obligations under 37 CFR 1.98 (a)(3).

* cited by examiner

Primary Examiner—Tom Dunn
Assistant Examiner—Jonathan Johnson
(74) Attorney, Agent, or Firm—Penny A. Clark; Patrick K. Patnode

(57) ABSTRACT

A method of lasing a filler wire to weld a first workpiece to a second workpiece comprising first and second materials, respectively, includes positioning a tip of the filler wire above an opening defined by the workpieces. The tip extends over a width of the opening and over a portion of each of the workpieces. The filler wire is preheated and melted by directing a laser beam at the tip. The laser beam is advanced along a length of the opening with the tip positioned under the laser beam to form a high aspect ratio weld between the workpieces. The high aspect ratio weld has an aspect ratio of at least about two. The energy and time required for the laser beam to melt the filler wire is reduced as the filler wire is preheated.

16 Claims, 6 Drawing Sheets

METHOD AND APPARATUS FOR INCREASING WELDING RATE FOR HIGH ASPECT RATIO WELDS

CROSS REFERENCE TO RELATED APPLICATIONS

This is a continuation in part of application Ser. No. 09/498,984, filed Feb. 7, 2000, now abandoned which is hereby incorporated by reference.

BACKGROUND OF INVENTION

The present invention relates to a method and apparatus for increasing welding rates for high aspect ratio (high depth to width ratios) welds, and more particularly, for increasing welding rates for high aspect ratio welds formed between similar or dissimilar crack sensitive workpieces using a filler wire.

Many traditional welding processes use a wire feed to supply a filler wire. However, and in applications where crack sensitive materials are involved, these processes typically apply too much heat and accordingly lead to unwanted defects.

In other processes, the wire is an auxiliary feed wire (a tungsten inert gas, or TIG process). However, these processes require more time.

For one current cladding process technique that is used to minimize defect formation, the crack sensitive alloys are maintained at an elevated temperature during the complete cladding process. However, when rebuilding the tip of a gas turbine airfoil (e.g. GTD111) this process could take several hours at elevated temperatures. Moreover, this is a manual process, which does not provide an operator friendly environment.

Other materials, such as IN738, are cycled between low and high temperatures to avoid having the component at elevated temperatures too long and thus, minimize defects and component distortion. However, such a cyclic process extends the processing times required to affect the required clad buildup.

Several prior art, welding processes employ laser welding techniques. For example, U.S. Pat. No. 4,634,832, (Martyr), assigned to British Shipbuilders, forms butt welds or T welds using a laser-induced plasma to weld adjacent walls of the plates to be welded. More particularly, the process of Martyr focuses a laser beam on a beam-interceptor material to form a plasma. The plasma is held in place by a gas supply such that the plasma transfers energy into the walls and thereby melts the faces, welding the two plates. Although this high energy laser welding process can be used to produce high aspect welds, it is unsuitable for welding crack-sensitive materials because the plasma would not only transfer excessive heat to the crack-sensitive materials to be welded but would further embed the beam interceptor material into the crack sensitive materials. Both the excessive heat and the embedding would cause defects and cracking.

U.S. Pat. No. 4,737,612 (Bruck et al.), assigned to Westinghouse Electric Corp., forms laser keyhole welds without filler material. This process is not desirable for crack sensitive materials because the energy transfer from the laser (having a power density of about two to five million watts per square centimeter) to two adjacent crack sensitive materials would cause cracking in the materials. Bruck et al. further discloses forming a laser conduction weld by passing a laser along the sides of the confronting surfaces to be joined and passing a resistively heated filler wire into the resulting metal pool. The latter process is also undesirable for crack sensitive materials and for the purposes of the invention for the following reasons. First, direction of a laser beam at the walls of two adjacent crack sensitive components to form a molten pool, would transfer excessive heat to the components, inducing cracks and other defects into the crack-sensitive materials. Further, Bruck et al. form a conduction weld. As known to those skilled in the art, conduction welds have low depth to width ratios and typically have distortion along the weld. Typical aspect ratios for conduction welds are less than or equal to one. Thus, the latter method of Bruck et al. does not produce the desired high aspect ratios of the present invention.

Another prior art laser welding process is disclosed in U.S. Pat. No. 4,803,334 (Burke et al), assigned to Westinghouse Electric Corp. Burke et al. form a conduction weld with a shallow pool of molten metal joining two, abutting metal matrix composite components by oscillating a laser beam across the intersection thereof. A preheated filler wire is fed into the molten pool to add filler material to the weld. Like the process of Bruck et al, this process is undesirable for crack-sensitive materials because direction of a laser beam at the walls of two adjacent crack sensitive components to form a molten pool, would transfer excessive heat to the components, inducing cracks and other defects into the crack-sensitive materials. Further, conduction welds have low aspect ratios and are prone to distortion.

Commonly assigned U.S. Pat. No. 5,958,261 (Offer et al.) describes an electric arc or laser welding process for producing high aspect ratio welds, in which a filler wire is fed into a groove extending above a work surface and defined by two opposing sidewalls. Although the tip of the filler wire is melted by the arc and/or the superheated weld puddle (depending on the wire aim position), and the groove is preferably narrow enough that cross seam oscillation is unnecessary, the remaining arc heat is primarily transferred directly to the workpiece, rather than to the filler wire, because the projected area of the diverging arc onto the workpiece is several times greater than the projected area onto the relatively thin wire. Thus, as expressly disclosed, the method of Offer et al. would be undesirable for use with crack-sensitive substrates because of the heat transfer to the substrates.

Accordingly, it would be desirable to develop a laser welding process employing a wire feed for producing high aspect ratio welds that can be used to join similar and dissimilar crack sensitive substrates.

SUMMARY OF INVENTION

In a first embodiment of the present invention, a method for lasing a filler wire to weld a first workpiece to a second workpiece is disclosed. The first and second workieces comprise first and second materials, respectively.

A tip of the filler wire is positioned above an opening defined by the first and second workpieces. The tip extends over a width of the opening and over a portion of the first workpiece and a portion of the second workpiece.

The filler wire is preheated. A laser beam is directed at the tip of the filler wire to melt it. The laser beam is advanced along a length of the opening with the tip of the filler wire being positioned under the laser beam to form a high aspect ratio weld between the first and second workpieces. The high aspect ratio weld has an aspect ratio of at least about two.

In a second embodiment of the present invention, an apparatus for laser welding a first workpiece to a second workpiece, the workpieces defining an opening, is disclosed.

A filler wire has a diameter that exceeds a width of the opening. A wire feed device is configured to continuously supply the filler wire. A guide is configured to direct a tip of the filler wire to a position above the opening to extend over the width of the opening and over a portion of the first workpiece and a portion of the second workpiece.

A laser is configured to direct a laser beam at the tip of the filler wire for forming a high aspect ratio weld between the first and the second workpieces. The high aspect ratio weld has an aspect ratio of at least about two. A power supply is configured to supply a current to the filler wire.

DETAILED DESCRIPTION

The present invention includes a method of lasing a filler wire. The invention is especially useful in welding applications for forming high aspect ratio welds between opposing sidewalls of similar and dissimilar crack-sensitive workpieces. However, the present invention is also beneficially applicable to cladding geometries.

Figure 1:
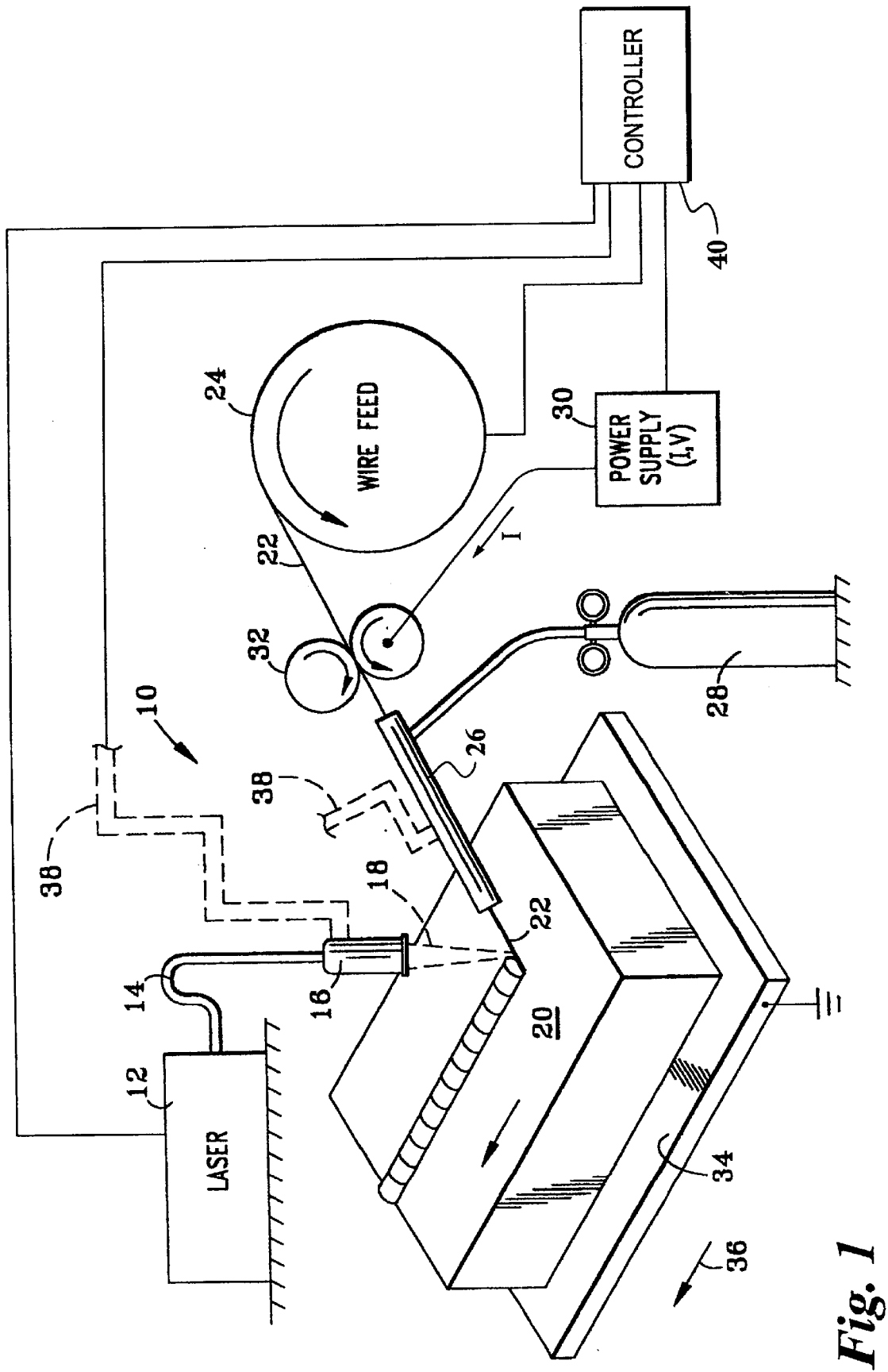
FIG. 1 is a front perspective view illustrating a cladding process of an embodiment of the present invention.

Referring now to FIG. 1, a cladding system 10 is illustrated. Cladding system 10 includes a laser 12. An exemplary laser 12 is a CW Nd:YAG laser capable of being operated at various power levels. A fiber optic cable 14 is secured to laser 12 at one end and a fiber optic coupler 16 at the other. Fiber optic coupler 16 contains optics for focusing a laser beam 18 at an intended target.

Here laser beam 18 is directed at a substrate 20 to which a wire 22 is to be flowed by the cladding or welding process of the instant application.

In accordance with the instant application, it is contemplated that substrate 20 is crack sensitive alloy substrate such as, GTD111, GTD222 and IN738 which are susceptible to deformation and cracking when exposed to high temperatures for extended periods of time. Of course, it is contemplated that the apparatus and method of the instant application may be applied to various other substrates.

Wire 22 is fed to substrate 20 by a wire feed device 24 that directs wire 22 through an elongated tube 26. Tube 26 also serves as a guide to direct wire 22 to its point of contact with substrate 20.

Tube 26 is also coupled to a gas supply 28 wherein an inert gas such as argon, helium, nitrogen etc. is introduced into tube 26 and tube 26 is configured so that the inert gas is outputted at the point where laser beam 18 flows wire 22 on substrate 20. The inert gas introduced by tube 26 into the welding area is used to shield the weld from outside contaminants and gases that may react with the weld. For example, the inert gas provides an atmosphere around the welding process of laser beam 18 whereby oxygen is removed to prevent unwanted side effects such as oxidation, defects, and cracking.

A power supply 30 provides a current to wire 22 through the use of drive wheels 32 in order to raise the temperature of wire 22. Drive wheels 32 complete the circuit from power supply 30 to wire 22. In accordance with Ohm's law, as power supply 30 increases the current through wire 22, the temperature of the wire 22 also increases because of IR (current times resistance) heating. Power supply 30 increases the temperature within wire 22 to a typical temperature of 500° Celsius or a temperature lower than the melting temperature of the wire used. Moreover, wire 22 should not be heated to a temperature that will cause the wire to lose its stiffness. Of course, it is contemplated that other temperatures and temperature ranges may be employed.

Drive wheels 32 are in a facing spaced relationship and are positioned to draw wire 22 from wire feed 24. Alternatively, a single drive wheel 32 and appropriately positioned guide pin provide the driving force to wire 22. Drive wheels 32 are mechanically driven by a variable speed motor (not shown). The motor speed and accordingly the speed of drive wheels 32 can be controlled in order to vary the rate at which wire 22 is fed to substrate 20. Moreover, the activation and accordingly the speed at which drive wheels 32 rotate can be controlled by a controller 40, which employs a programmable computer algorithm.

In addition, power supply 30 provides a means for varying the temperature within wire 22. Moreover, the intrinsic characteristics of wire 22 such as material type, size (i.e. diameter) and length can be introduced into a controller 40, which also is provided with the voltage and current supply to wire 22 to easily provide a means for producing a certain temperature within wire 22.

Of course, it is contemplated that the required temperature of wire 22 will vary in accordance with the type of wire (i.e. size and material) used, the type of substrate and the required cladding temperature.

Figure 2:
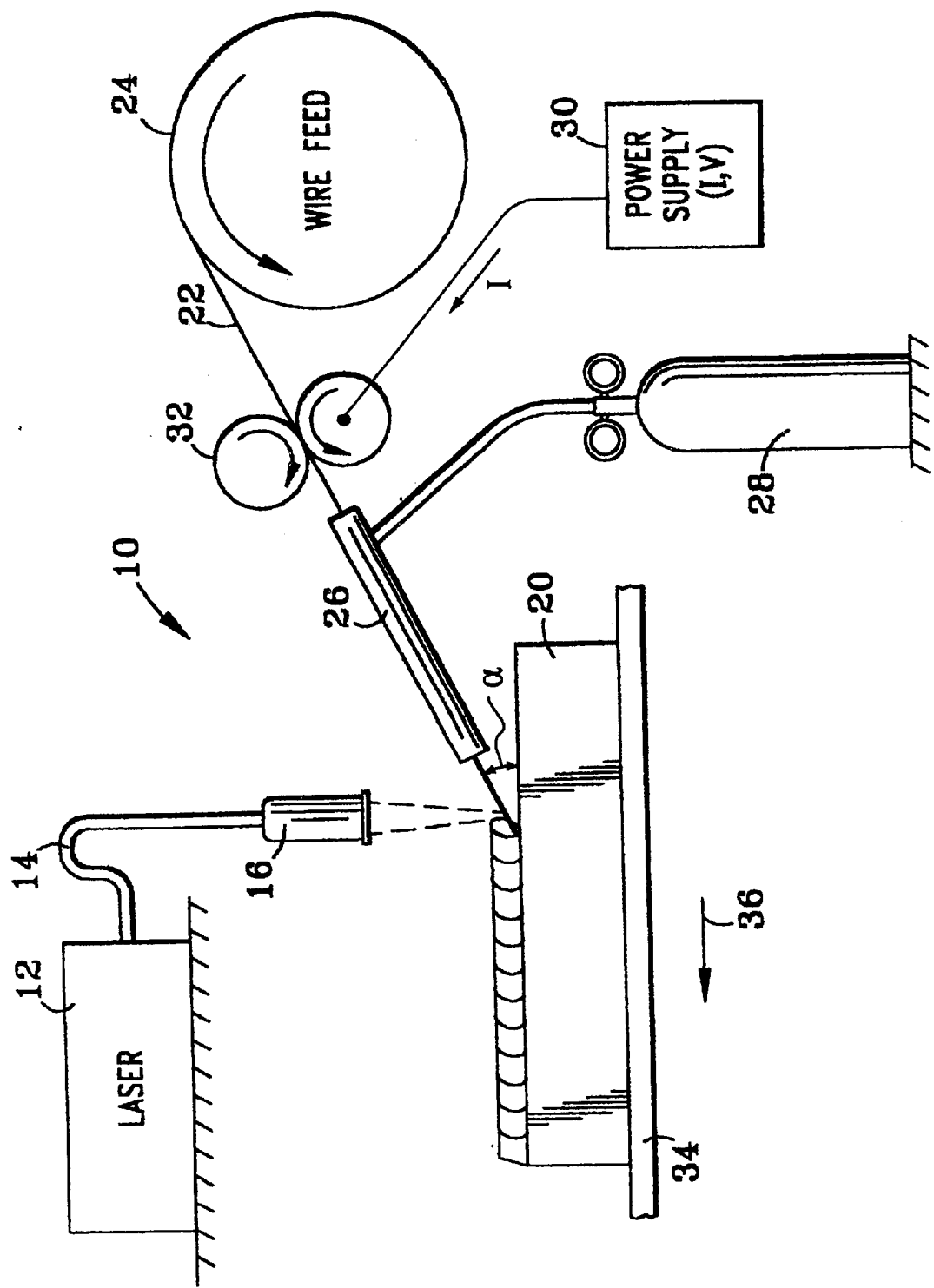
FIG. 2 is a side view of the FIG. 1 embodiment.

Referring now in particular to FIGS. 1 and 2, it is preferred that the portion of wire 22 being flowed on substrate 20 is arranged at an angle α. Angle α is preferably 15–30°. It is, of course, contemplated that angle sizes greater than 30° and less than 15° can be employed. Laser 12 generates laser beam 18 that is focused upon the point of contact between wire 22 and substrate 20.

At the point of contact, laser beam 18 provides additional heat to wire 22 and accordingly wire 22 is melted and thus flowed on substrate 20. It is noted that wire 22 also acts as a "filler rod" whereby wire 22 is consumable and provides the material for creating a weld. Since wire 22 is already preheated by power supply 30 no excess energy of laser beam 18 is wasted upon heating wire 22. Therefore a significant amount, if not all, of the energy of laser beam 18 is devoted to the cladding of wire 22 to substrate 20. Moreover, and since wire 22 is already preheated, the portion of substrate 20, to which wire 22 is being flowed upon, is not overheated and accordingly, there is less likelihood of defects due to overheating.

In addition, and since the majority of the laser power is devoted to bringing the temperature of wire 22 from a pre-heated temperature to a melting temperature, the cladding rate is much faster. Additionally, the power acquired from laser 12 is also lower and accordingly, a lower power and lower cost laser can be used.

The power level use of laser 12 is also dependent upon the wire feed rate, the substrate surface travel speed and the wire diameter. For example, if the wire feed rate and substrate surface travel speed is increased, the power of laser 12 will be increased accordingly. In addition, if the size of wire 22 is increased the resulting power output of laser 12 will be increased.

Substrate 20 is secured to a translation table 34, which provides a means for moving substrate 20 in a controlled fashion. As illustrated in FIG. 1, substrate 20 is moved in the direction of arrow 36. This movement causes wire 22 to be flowed on substrate 20 as it passes underneath laser beam 24. However, substrate 20 may be moved in any direction that will facilitate the cladding of wire 22 to substrate 20.

A controller 40 is used to synchronize the operation of laser 12, wire feed 24 and translation table 34 such that once the cladding system is engaged the laser will continuously clad wire 22 onto substrate 20. Moreover, controller 40 will utilize a computer algorithm into which operating parameters can be programmed. For example, a clad of 20 mm in a given direction can be programmed whereby the system will shut down once translation table 34 and wire feed 24 have inputted 20 mm of wire through laser beam 24. It is, of course, contemplated that welds greater than or less than 20 mm can be programmed into the system.

In addition, other aspects may be inputted into the computer algorithm such as the desired pre-heating temperature of wire 22 prior to the activation of system 10.

As an alternative or a supplement to translation table 34, a robot arm 38 coupled to a robot (not shown) will provide the necessary movement of fiber optic coupler 16 and a wire feed system in order to direct laser beam 18 at the appropriate location in order to facilitate the clad of wire 22 to substrate 20. For an exemplary embodiment, robot arm 38 manipulates fiber optic coupler 16 and the wire guide or elongated tube 26 to advance the laser beam 18 and a tip 27 of wire 22 along substrate 20.

Moreover, the movement of the robot arm can be inputted into controller 40 or computer algorithm wherein predetermined clads or welds can be preprogrammed.

Figure 3:
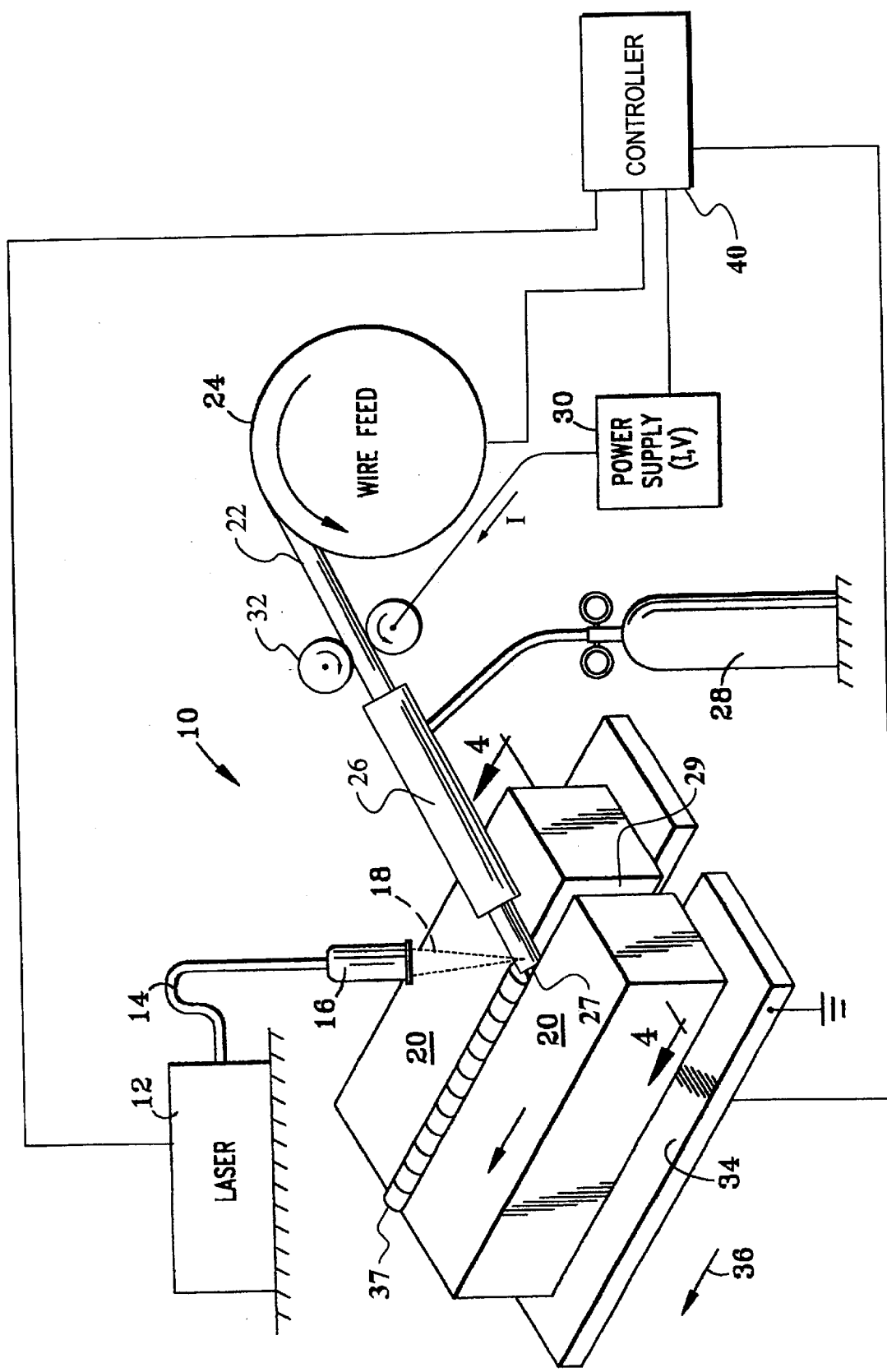
FIG. 3 is a front perspective view illustrating a laser welding process and apparatus embodiment of the present invention.

Referring now to FIG. 3, a method of lasing a filler wire to weld a first workpiece 20 to a second workpiece 20 is illustrated. The first and second workpieces comprise first and second materials, respectively. For example, two similar or dissimilar crack sensitive substrates 20 are welded to each other. Alternatively, only one (or none) of the workpieces 20 may be crack sensitive.

In this embodiment, a tip 27 of filler wire 22 is positioned above an opening 29 defined by first and second workpieces 20, as shown in FIG. 3. Tip 27 extends over a width 31 of opening 27 and over a portion 33 of first workpiece 20 and a portion 33 of second workpiece 20, as shown more clearly in FIG. 5.

Filler wire 22 is preheated, as shown in FIG. 3 and as discussed above in detail with respect to the cladding application. For example, filler wire 22 is preheated using power supply 30 and drive wheels 32, to a temperature of less than about five hundred (500) degrees Celsius, as discussed above with respect to the cladding application. Filler wire 22 is melted by directing a laser beam 18 at tip 27, as indicated in FIG. 3. One exemplary laser 12 for emitting a laser beam 18 is a CW Nd:YAG laser secured to fiber optic cable, which in turn is connected to fiber optic coupler 16, as shown in FIGS. 1 and 3 and discussed above with respect to the cladding application.

Laser beam 18 is advanced along a length of opening 29 with tip 27 being positioned under laser beam 18, as shown in FIG. 3. For example, workpieces 20, 20 are secured to translation table 34, as shown in FIG. 3. Translation table 34 provides a means for moving workpieces 20, 20 and thereby advance laser beam 18 along opening 29, as discussed above with respect to the cladding application. Alternatively or as a supplement to translation table 34, a robot arm 38 is employed to advance laser beam 18, as shown in FIG. 1 and discussed above with the cladding application. By advancing laser beam 18 along the length of opening 29, a high aspect ratio weld 37 between first and second workpieces 20, 20, is formed. As used here, the term "high aspect ratio weld" means an aspect ratio of at least about two. According to more particular embodiments, the aspect ratio exceeds about three or four. More particularly, laser beam 18 is advanced only once along the length of opening 29, to form high aspect ratio weld 37.

Beneficially, melting preheated wire 22 by directing laser beam 18 at tip 27 helps to protect crack sensitive substrates 20 from cracking, as compared to known methods. More particularly, less of the laser power is transferred to workpieces 20 using the present method than for known methods, which direct a laser beam at the workpieces to form a molten weld pool and then insert a filler wire into the weld pool for melting. The same advantages of the present invention apply when compared to known methods that oscillate the laser beam across the opening to form a weld pool and then insert the filler wire into the weld pool for melting. Because tip 27 extends over width 31 of opening 27 and over portions 33 of workpieces 20, 20, a majority of the incident laser power is directed into tip 27 for melting filler wire 22. In contrast, these known methods direct a majority of the incident laser power into the workpieces.

The method is beneficially used to weld workpieces 20, 20 comprising crack sensitive materials. For a particular embodiment, both the first and second materials are crack sensitive. More particularly, the first and second materials comprise the same or different crack sensitive materials. The latter application of the method is particularly advantageous because joining two different crack sensitive materials is typically more crack prone than is joining two workpieces comprising the same crack sensitive materials, due to the lattice mismatches between the two different materials. However, because a majority of the incident laser power is directed into tip 27 for melting filler wire 22, the inventive method helps to protect crack sensitive substrates 20 from cracking during welding.

In addition, by forming high aspect ratio weld 37 by advancing laser beam 18 along the length of opening 29 only once, welding speed is advantageously increased over known methods which employ several passes of a laser beam along the length of the opening to form a weld. In addition, forming a weld in one pass of laser beam 18 provides a cleaner weld, as compared to several passes of a laser beam each pass forming a layer of a weld. By "cleaner weld," it is meant that the weld has less distortion, or bending of the opposing walls of the workpieces along the weld and that the weld contains less defects, such as porosity and cracks. Welds comprising a series of layers are prone to distortion because the formation of each of the layers creates different stresses on the opposing walls along the depth of the weld.

In order to shield workpieces 20, 20 from the central portion of laser beam 18, a diameter 35 of filler wire 22, according to a particular embodiment, exceeds width 31 of opening 29 by about ten percent (10%) of width 31, and, more particularly, by about fifteen percent (15%) of width 31. For example, for an exemplary opening width of about 0.6 mm (or 25 mils), an exemplary wire diameter is about 0.75 mm (or 30 mils). Assuming a Gaussian laser beam with width of about 1 mm (or 40 mils) at tip 27, the majority of the laser power will be transferred into filler wire 22, thereby melting filler wire efficiently and protecting workpieces 20, 20 from excessive heating.

According to a particular embodiment, tip 27 of filler wire 22 is arranged at an angle of about fifteen (15) degrees to about thirty (30) degrees with respect to workpieces 20, 20, as discussed above with respect to the cladding application.

Figure 6:
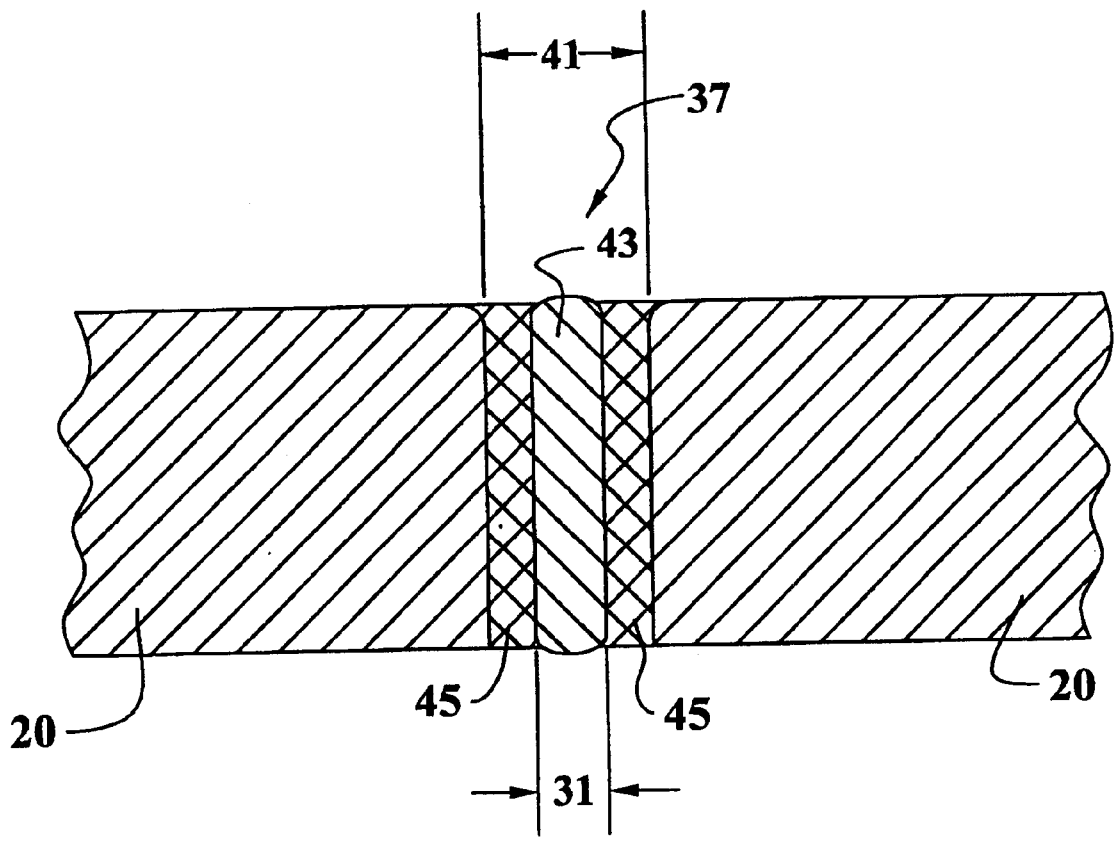
FIG. 6 illustrates an exemplary high aspect ratio weld formed using the laser welding process and apparatus of FIG. 3.

In order to deliver a continuous supply of filler material for forming weld 37, the method according to a particular embodiment further includes continuously feeding filler wire 22 to maintain tip 27 above opening 29. For example, filler wire 22 is fed using wire feed 24 through elongated tube 26, as discussed above with respect to the cladding application and as shown in FIG. 3. The method of this embodiment further includes using a controller 40 employing a computer algorithm to control advancement of laser beam 18, to control the continuous feeding of filler wire 22, and to control the power and energy of laser beam 18, as discussed above with respect to the cladding application. Beneficially, controller 40 synchronizes the operation of laser 12, wire feed 24, and translation table 34, to continuously laser weld workpieces 20, 20. More particularly, the method further includes selecting a feed rate for filler wire 22, a rate for advancing laser beam 18, and a laser power to control an average width 41 of high aspect ratio weld 37 to be in a range of about one and a half (1.5) to about three (3) times, and more particularly in a range of about two (2) to about two and a half (2.5) times the width 31 of opening 29. An illustrative high aspect weld 37 is shown in FIG. 6. A central portion 43 of weld 37 comprises material from filler wire 22, and side portions 45 comprise material from filler wire 20 and from workpieces 20, 20. Exemplary dimensions for weld 37 are a weld depth of about five mm (or 200 mils), an opening width 31 of about 0.6 mm (or 25 mils), and an average weld width 41 in a range of about 1.2 mm (or fifty mils) to about 1.7 mm (or seventy mils).

Figure 4:
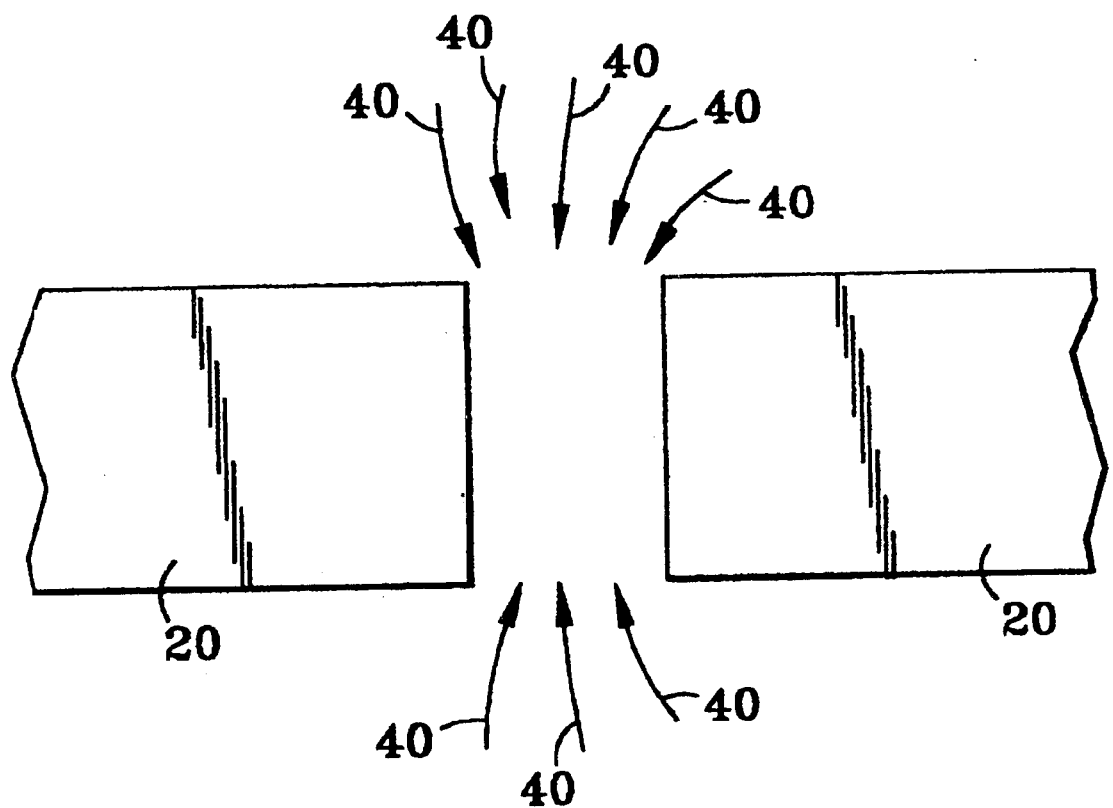
FIG. 4 is a view along the lines 4—4 of the FIG. 3 embodiment with a filler wire not shown.

Referring now to FIG. 4, and depending on the weld application, the inert gas, as indicated by arrows 40, is introduced to both sides of workpieces 20 at the point of the weld. The inclusion of the inert gas, as indicated above, protects the weld from outside contaminants.

Figure 5:
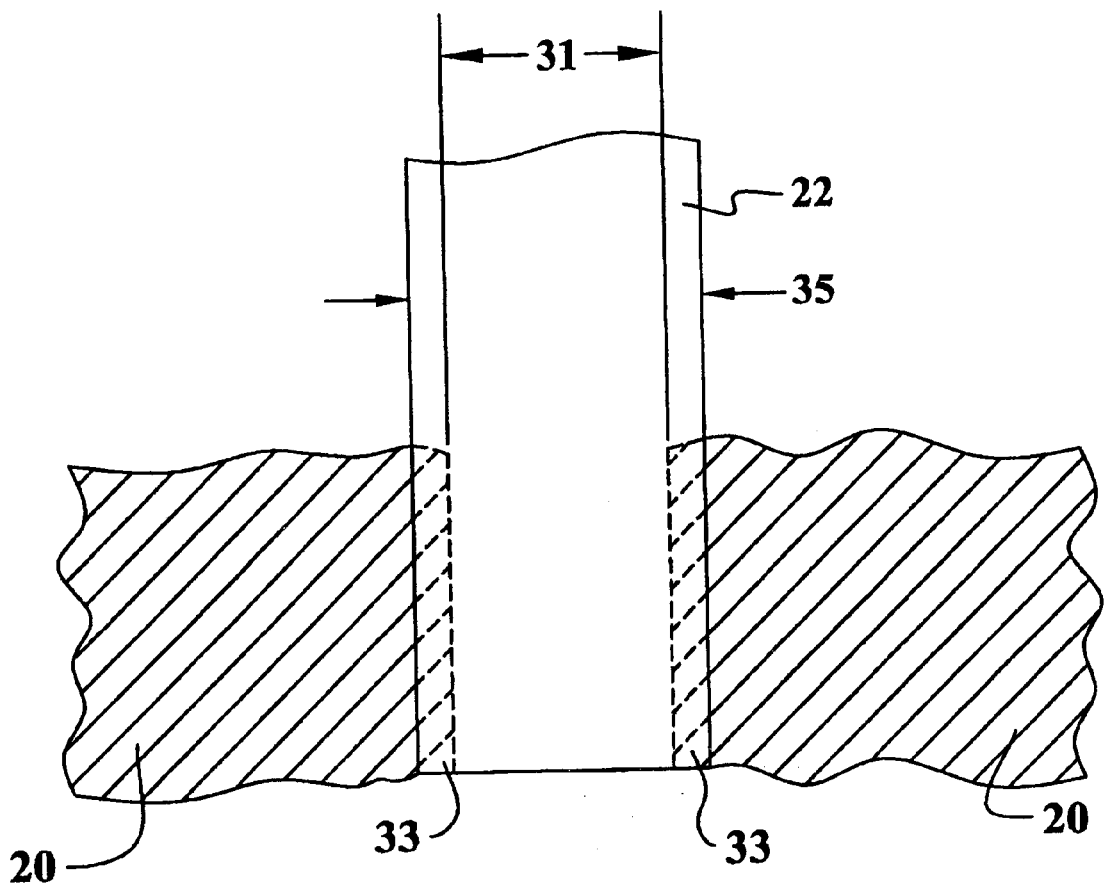
FIG. 5 shows the view of FIG. 4 with the filler wire.

An apparatus 100 embodiment for laser welding first workpiece 20 to second workpiece 20, is discussed with respect to FIGS. 3, 5, and 6. As shown in FIG. 5, apparatus 100 includes filler wire 22 having a diameter 35 that exceeds width 31 of opening 29. Apparatus 100 further includes a wire feed device 24 configured to continuously supply filler wire 22, and a guide 26 for directing tip 27 of filler wire 22 to a position above opening 29 to extend over the width 31 of opening 29 and over portions 33 of workpieces 20, 20, as shown for example in FIG. 5. Apparatus further includes laser 12 configured to direct laser beam 18 at tip 27 of filler wire 22 for forming a high aspect ratio weld 37 between workpieces 20, 20. As noted above, high aspect ratio weld has an aspect ratio of at least about two and, more particularly, exceeding about three or four.

Apparatus 100 further includes power supply 30 configured to supply a current to filler wire 22 for preheating filler wire 22.

In order to advance laser beam 18 along a length of opening 29, the apparatus 100 according to a particular embodiment, further includes robot arm 38 coupled to laser 18, for example via fiber optic coupler 16, and configured for redirecting laser beam 18. Robot arm 38 is indicated in FIG. 1. More particularly, apparatus 100 further includes controller 40 employing a computer algorithm and configured to control wire feed device 24, laser 18, and robot arm 38, for example to synchronize their operation to continuously laser weld workpieces 20, 20.

Instead of or as a supplement to employing robot arm 34, apparatus 100 further includes a translation means 34 for moving workpieces 20, 20 to advance laser beam 18 along a length of opening 29 with tip 27 being positioned under laser beam 18 to form high aspect ratio weld 37. An exemplary translation means is translation table 34, as shown in FIG. 3. More particularly, apparatus 100 further includes controller 40 employing a computer algorithm and configured to control wire feed device 24, laser 18, and translation means 34, for example to synchronize their operation to continuously laser weld workpieces 20, 20 and, more particularly, to control an average width 41 of high aspect ratio weld 37 to be in a range of about one and a half (1.5) to about three (3) times the width 31 of opening 29. An exemplary high aspect ratio weld 37 is illustrated in FIG. 6.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of lasing a filler wire to weld a first workpiece to a second workpiece, the first and second workpieces comprising a first and a second material respectively, said method comprising:
   positioning a tip of the filler wire above an opening defined by the first and second workpieces, wherein the tip extends over a width of the opening and over a portion of the first workpiece and a portion of the second workpiece;
   preheating the filler wire;
   melting the filler wire by directing a laser beam at the tip of the filler wire; and
   advancing the laser beam along a length of the opening with the tip of the filler wire being positioned under the laser beam to form a high aspect ratio weld between the first and second workpieces, wherein the high aspect ratio weld an aspect ratio of at least about two.

2. The method of claim 1, wherein said melting consists of directing the laser beam at the tip of the filler wire.

3. The method of claim 1, wherein said advancement of the laser beam along the length of the opening is performed only once to form the high aspect ratio weld.

4. The method of claim 3, wherein a diameter of the filler wire exceeds the width of the opening by about ten percent (10%) of the width of the opening.

5. The method of claim 4, wherein the diameter of the filler wire exceeds the width of the opening by about fifteen percent (15%) of the width of the opening.

6. The method of claim 3, wherein the aspect ratio exceeds about three.

7. The method of claim 6, wherein the aspect ratio exceeds about four.

8. The method of claim 3, further comprising:
   continuously feeding the filler wire to maintain the tip above the opening; and
   controlling said advancement, said continuous feeding, and an energy and a power of the laser beam using a controller employing a computer algorithm.

9. The method of claim 8, further comprising selecting a feed rate for said continuous feeding, selecting a rate for said advancement, and selecting the laser power to control an average width of the high aspect ratio weld to be in a range of about one and a half (1.5) to about three (3) times the width of the opening.

10. The method of claim 9, wherein said selection of the feed rate, said selection of the rate for said advancement, and said selection of the laser power control the average width of the high aspect ratio weld to be in a range of about two (2) to about two and a half (2.5) times the width of the opening.

11. The method of claim 3, wherein said preheating heats the filler wire to a temperature of less than about five hundred (500) degrees Celsius.

12. The method of claim 3, wherein the first and second materials are crack sensitive.

13. The method of claim 12, wherein the first and second materials are the same material.

14. The method of claim 12, wherein the first and second materials are different.

15. A method of lasing a filler wire to weld a first workpiece to a second workpiece, the first and second workpieces comprising a first and a second crack-sensitive material respectively, said method comprising:

positioning a tip of the filler wire above an opening defined by the first and second workpieces, wherein the tip extends over a width of the opening and over a portion of the first workpiece and a portion of the second workpiece, and wherein a diameter of the filler wire exceeds the width of the opening by about ten percent (10%) of the width of the opening;

preheating the filler wire;

melting the filler wire by directing a laser beam at the tip of the filler wire; and advancing the laser beam only once along a length of the opening with the tip of the filler wire being positioned under the laser beam to form a high aspect ratio weld between the first and second workpieces, wherein the high aspect ratio weld has an aspect ratio of at least about two.

16. The method of claim 15, further comprising:

continuously feeding the filler wire to maintain the tip above the opening;

controlling said advancement, said continuous feeding, and an energy and a power of the laser beam using a controller employing a computer algorithm; and selecting a feed rate for said continuous feeding, selecting a rate for said advancement, and selecting the laser power to control an average width of the high aspect ratio weld to be in a range of about one and a half (1.5) to about three (3) times the width of the opening.

* * * * *